H. J. DAVIS.
SAW FILING CLAMP.
APPLICATION FILED APR. 13, 1917.
1,263,652.
Patented Apr. 23, 1918.
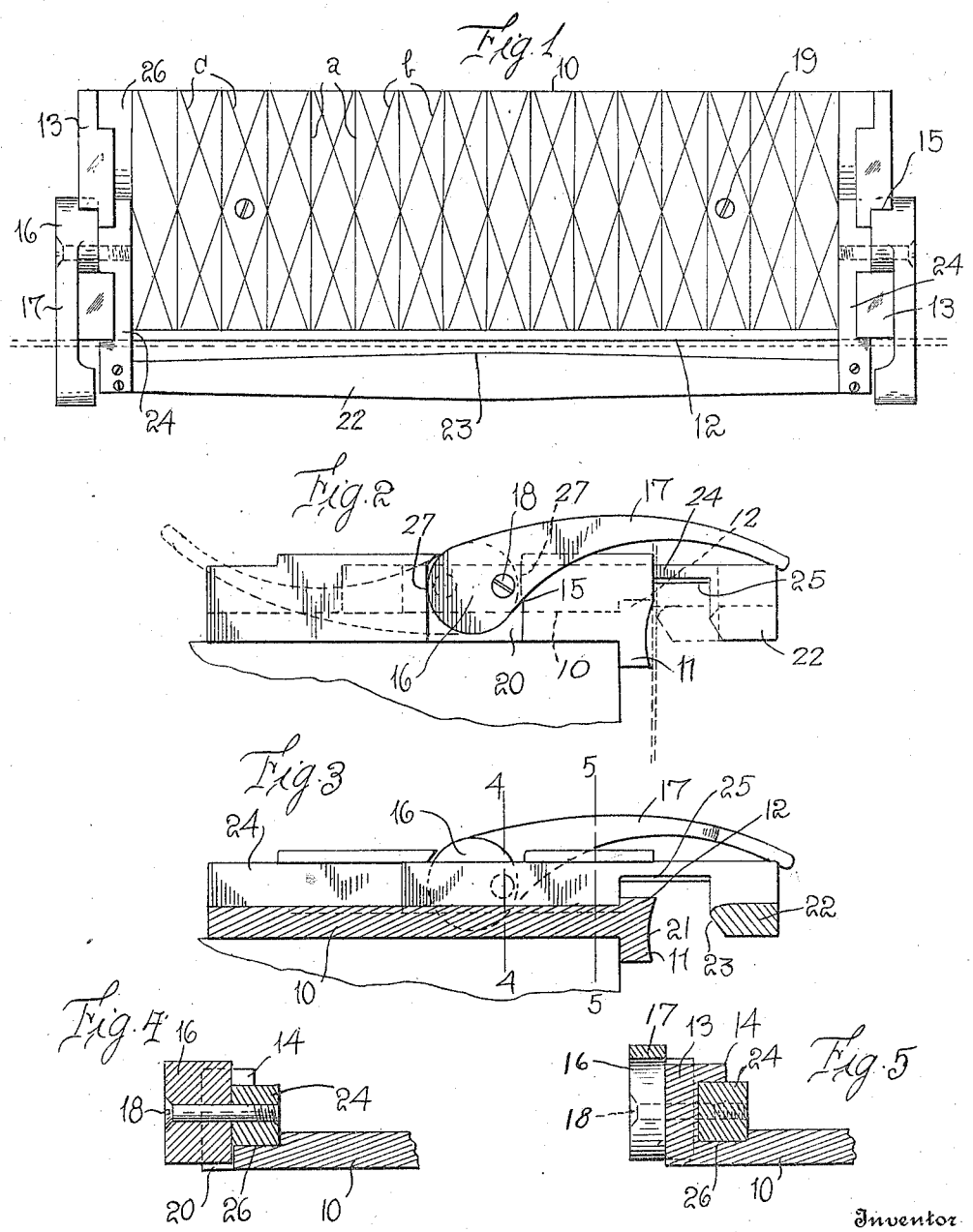
Inventor
H. J. Davis
By Watson E. Coleman
Attorney

UNITED STATES PATENT OFFICE.

HENRY JEFFERSON DAVIS, OF WAYNESBORO, GEORGIA.

SAW-FILING CLAMP.

1,263,652.  Specification of Letters Patent.  Patented Apr. 23, 1918.

Application filed April 13, 1917. Serial No. 161,859.

*To all whom it may concern:*

Be it known that I, HENRY JEFFERSON DAVIS, a citizen of the United States, residing at Waynesboro, in the county of Burke and State of Georgia, have invented certain new and useful Improvements in Saw-Filing Clamps, of which the following is a specification, reference being had to the accompanying drawings.

This invention relates to saw clamps, and particularly to clamps for holding a saw while it is being filed.

Clamps of this character usually have a number of objectionable features. For one thing, the saw trembles while the teeth are being filed, because the clamp is not sufficiently solidly supported. For another thing, the saw clamps do not act to firmly clamp saws having different thicknesses, and for another, there is no means of guiding the file in lines diagonal to the plane of the saw or at right angles to the plane of the saw. Thus the filing of the teeth is not accurately done.

The general object of my invention is to provide a saw clamp of a very simple form which may be cheaply made, and which is so constructed as to be entirely rigid when fastened down upon a bench or other supporting member.

A further object is to provide upon the face of one member of the saw clamp, guiding lines extending in reverse diagonal directions relative to each other and to the saw blade when it is clamped and guiding lines extending at right angles to the saw blade when it is clamped, these lines, which may be in the form of ribs, grooves or lines formed upon the face of the body of the clamp, acting to guide the file when in use.

A further object is to so form one clamping member of the saw clamp of material which will have a slight spring and form the face of this member, where it confronts the face of the other member, with a slight curve so that when the clamps are brought together the middle portions of the movable clamp will first engage the saw and then the end portions will be drawn inward against the resilience of the material, and will firmly clamp upon the saw blade, thus securing the resilient clamping action.

Still another object is to so construct the clamping members that a three point, or, as it may be termed, a three edged bearing will be secured for the saw blade between the clamping members.

Still another object is to provide improved means for drawing the movable clamping member against the body clamp to grip the saw between the clamping jaws and another object is to so construct the clamp that the body member may be rigidly fastened down upon the work bench or other support.

Other objects will appear in the course of the following description.

My invention is illustrated in the accompanying drawings, wherein:—

Figure 1 is a top plan view of my improved clamp, the jaws of the clamp being open;

Fig. 2 is an end elevation showing the table on which the clamp is mounted in section;

Fig. 3 is a sectional view of the clamp midway between its ends;

Fig. 4 is a section on the line 4—4 of Fig. 3;

Fig. 5 is a section on the line 5—5 of Fig. 3.

Referring to these drawings, 10 designates the body portion of the clamp, which is intended to be attached to a work bench and which consists of a flat plate having at its forward edge a downwardly extending flange 11 and a slight upwardly extending flange 12. This plate at its ends is formed with upwardly extending walls 13 and with overhanging flanges 14. Each of these walls 13 with its flange 14 is cut away as at 15 to accommodate a clamping cam or eccentric 16. This clamping cam or eccentric has a curved handle or arm 17 attached to it and is perforated for the passage of a screw, pin or other suitable equivalent member 18. The plate, constituting the member 10, is formed at a plurality of points with openings 19 through which screws may be passed to hold the plates solidly down upon a bench or other supporting table, with the downwardly extending flange 11 abutted against the edge of the table so that the plate will be particularly solid. The plate forming the member 10 is also cut away as at 20 at its ends to accommodate the cam 16. The edge face of the member 10 is slightly concavely curved as at 21, as illustrated most clearly in Fig. 3.

Coacting with the fixed member 10 which, as before stated, contitutes one jaw of the saw clamp, is a longitudinally extending bar 22, which constitutes the other jaw of the clamp. This bar on its inner face is longitudinally bowed outward as at 23. This longitudinal curve is relatively slight. Vertically the face 23 is downwardly curved or rounded, as seen from Fig. 3. The upper face of this member 22 is slightly below the flange 12 so that the saw disposed between the members 10 and 22 will be clamped at three points, as indicated clearly in Fig. 2.

The movable jaw 22 has attached to its ends the inwardly extending slides or arms 24, each of these slides just inward of the point of attachment of the bar or clamping member 22 being recessed, as at 25. These sliding members 24 slide in grooves 26, or any other suitable guideways, and, of course, are held down firmly upon the member 10 by the overhanging flanges 14. The cams 16 are attached to these sliding arms 24 by means of screws or pins 18 and it will be seen that these cams exert camming action against the shoulders 27 formed by cutting away the end walls 13, as at 15.

The face of the plate forming the member 10 is provided with a plurality of spaced lines $a$ extending at right angles to the length of the clamps 10 and 22, with a plurality of lines $b$ extending parallel to each other diagonally to the line of the saw when clamped, and a plurality of lines $c$ also extending diagonally to the plane of the saw when clamped, but extending in an opposite direction to the lines $b$. These lines $a$, $b$ and $c$ are guides whereby the operator may judge if he is holding the file properly in order to make the proper direction of cut in the saw teeth. In rip cut saws and meat saws, the teeth are sharpened by driving the file at right angles to the plane of the teeth but other forms of saws are sharpened by disposing the file at an angle to the plane of the teeth and these angles are fully indicated by the lines $a$, $b$ and $c$. These lines may be formed by upwardly extending ribs, by grooves cut in the face of the plate or by lines scratched or etched across the face of the plate.

In the use of this device, the blade of the saw is extended upward between the clamping member 22 and the clamping member 10 and then the clamping member 22 is drawn toward the clamping member 10 by rotating the cams 16. The middle portion of the member 22 will strike the saw first and then as the cams are further rotated the end portions of the clamping member 22 will be drawn inward thus causing the member 22 to exert a resilient binding action upon the saw blade. The teeth are then filed and when all the teeth of this portion are filed, the clamp is released, the saw moved along another stretch and again clamped in place.

A saw clamp of this character holds the saw very firmly and does not allow the saw to tremble. The trembling of the saw when being filed tends to wear out the file and is bad for the saw. This trembling action cannot occur because the plate 10 is firmly held down upon the work bench with its jaw edge, through the medium of the flange 11, abutted firmly against the edge of the bench. Inasmuch as the saw is gripped along three lines coinciding with the upper and lower edges of the clamping face of the plate 10 and the edge of the clamping member 22, it will be held very firmly. My device is very simple, it is extremely cheap, may be readily applied in all sorts of situations and I have found it very effective in practice.

Having described my invention, what I claim is:—

1. In a saw clamp, a body member adapted to be attached to a bench or other support and forming one jaw of a clamp, a second clamping member confronting the edge of the body member and having arms slidably engaging with the member, said second named member having its inner edge face slightly convex longitudinally and the second named clamping member being slightly resilient, and means engaging the arms and mounted upon the body member for adjusting said clamping member toward or from the body member.

2. A saw filing clamp of the character described comprising a body member formed of a plate adapted to be attached to a bench or other support, a clamping member slidingly mounted on the plate movable toward or from the plate, and means for adjusting the clamping member, the face of the plate being formed with file guiding lines, said lines extending at evenly spaced distances across the entire face of the plate, a certain series of lines extending at right angles to the edge of the plate, a second series extending diagonally to the edge of the plate, and a third series extending diagonally to the edge of the plate but at an inclination to the second named series.

3. A saw filing clamp comprising a plate having a downwardly extending edge flange, the plate being adapted to be attached to a bench, the ends of the plate being formed with upwardly extending end walls, said end walls having overhanging flanges and being interrupted in their length, a clamping member movable toward or from said plate and having inwardly extending arms at its ends, extending beneath the inwardly extending flanges on the end walls and slidable in guideways formed in the plate, and cams disposed in the interrupted portions of said end walls and bearing against the end faces of said end walls and pivotally connected to said arms, said cams having operative handles extending therefrom.

In testimony whereof I hereunto affix my signature in the presence of two witnesses.

HENRY JEFFERSON DAVIS.

Witnesses:
F. B. WRIGHT,
M. R. WILSON.